US011866454B2

(12) United States Patent
Wolter et al.

(10) Patent No.: US 11,866,454 B2
(45) Date of Patent: Jan. 9, 2024

(54) DEGRADABLE SILANE HAVING THIO AND AMINO GROUPS, SILICIC ACID POLYCONDENSATES AND HYBRID POLYMERS PRODUCED THEREFROM, USE THEREOF AND METHOD FOR PRODUCING THE SILANES

(71) Applicant: Fraunhofer-Gesellschaft zur Foerderung der angewandten Forschung e.V., Munich (DE)

(72) Inventors: Herbert Wolter, Wuerzburg (DE); Somchith Nique, Wuerzburg (DE); Johannes Schwaiger, Wuerzburg (DE)

(73) Assignees: Fraunhofer-Gesellschaft zur Foerderung der angewandten Forschung e.V., Munich (DE); Julius-Maximilians-Universität Würzburg, Würzburg (DE)

( * ) Notice: Subject to any disclaimer, the term of this patent is extended or adjusted under 35 U.S.C. 154(b) by 133 days.

(21) Appl. No.: 16/973,523

(22) PCT Filed: May 29, 2019

(86) PCT No.: PCT/EP2019/063979
§ 371 (c)(1),
(2) Date: Dec. 9, 2020

(87) PCT Pub. No.: WO2019/238426
PCT Pub. Date: Dec. 19, 2019

(65) Prior Publication Data
US 2021/0261576 A1 Aug. 26, 2021

(30) Foreign Application Priority Data
Jun. 15, 2018 (DE) .......................... 102018114406.7

(51) Int. Cl.
*C07F 7/18* (2006.01)
*C08G 77/28* (2006.01)

(52) U.S. Cl.
CPC ............ *C07F 7/1804* (2013.01); *C08G 77/28* (2013.01)

(58) Field of Classification Search
None
See application file for complete search history.

(56) References Cited

U.S. PATENT DOCUMENTS

| 5,414,093 | A | 5/1995 | Wolter |
| 5,756,767 | A | 5/1998 | Wolter |
| 5,792,881 | A | 8/1998 | Wolter et al. |
| 5,917,075 | A | 6/1999 | Wolter |
| 9,539,763 | B2 | 1/2017 | Houbertz-Krauss et al. |
| 10,259,829 | B2 | 4/2019 | Wolter et al. |
| 2009/0277559 | A1 | 11/2009 | Kurija |
| 2013/0012612 | A1 | 1/2013 | Houbertz-Krauss et al. |
| 2017/0313726 | A1 | 11/2017 | Wolter et al. |

FOREIGN PATENT DOCUMENTS

JP 2011242572 A 12/2011

OTHER PUBLICATIONS

Coffey, D Scott et al., "A practical entry to the crambescidin family guanidine alkaloids. Enantioselective total syntheses of ptilomycalin A, crambescidin 657 and its methyl ester (neofolitispates 2), and crambescidin 800", Journal of the American Chemical Society; vol. 122; nb 20; (2000); p. 4893-4903.

Johansson, Anja et al., Acyl sulfonamides as potent protease inhibilors of the hepatitis C virus full-length NS3 (protease-helicase/NTPase): A comparative study of different C-terminals, Bioorganic and Medicinal Chemistry, Bd. 11, Jan. 1, 2003 (Jan. 1, 2000).

Arind Misra, et al., Immobilization of self-quenched DNA hairpin probe with a heterobifunctional reagent on a glass surface for sensitive detection of oligonucleotides, Bioorganic and Medical Chemistry, ve detecti◇ n ◇ f 01 i 9◇ nucl eotides, Bioorganic & Medicinal Chemistry: A Tetrahedron Publication for the Rapid Dissemination of Full Original Research Papers and Critical Reviews on Biomolecular Chemistry, Medicinal Chemistry and Related Disciplines, Elsevier, NL, Bd. 17, Nr. 16, 15. Aug. 2009, pp. 5826-5833.

(Continued)

*Primary Examiner* — Alexander R Pagano
(74) *Attorney, Agent, or Firm* — Duane Morris LLP

(57) ABSTRACT

The present invention concerns a silane of formula (1)

$$R^1{}_a SIR_{4-a} \qquad (1)$$

where
the group $R^1$ or each of the groups $R^1$ independently
  is bound to the silicon via an oxygen atom,
  comprises a straight or branched hydrocarbonaceous chain having one or more elements, wherein
  (a) each of the elements has not more than 8 consecutive carbon atoms, each of plural elements of the hydrocarbonaceous chain being separated from the next element by a cleavable group and/or
  (b) the elements have one or more cleavable groups and any hydrocarbonaceous chains remaining upon cleavage of said group(s) are water soluble,
  wherein said cleavable groups are selected from ester, anhydride, amide, carbonate, carbamate, ketal, acetal, disulfide, imine, hydrazone and oxime groups,
  has at least one thiol or a primary or secondary amino group,
the group R or each of the groups R is independently a hydrolytically condensable group, and
a is 1,2,3 or 4.

The invention further relates to organically modified, polymerized silicic acid polycondensates which have been obtained by reaction and optionally subsequent hydrolytic condensation of such a silane or of silicic acid polycondensates therefrom with a bridging compound, which undergo an addition reaction with the at least one thiol or primary or secondary amino group of the radical $R^1$ of the silane of the formula (1).

5 Claims, 2 Drawing Sheets

(56) References Cited

OTHER PUBLICATIONS

Sherman, Daniel, et al., One-pot tethering of organic molecules through non-symmetric malonate deriatives, malonate derivatives, Tetrahedron Letters, Bd. 46, Nr. 29, Jan. 1, 2005 (Jan. 1, 2005), pp. 4901-4903, XP055673926.
Volkova et al., Synthesis of Acyloxybutyl)Dimethylchlorosilanes, Bis(Acyloxybutyl) Tetramethyldisiloxanes, and Their Derivatives, Journal of General Chemistry of the USSR, Bd. 62, Nr. 8, Jan. 1 (Jan. 1, 1992 }, pp. 1515-1518, XP055673936.
Taylor Ware, et al., Degradable, silyl ether thiol-ene networks, In: RSC Advances, vol. 4, 2014, S. 39991-40002.—ISSN 2046-2069.
Voronkov et al., "Trialkylsilyl- and 1-silatranylmethyl esters of 4-aminobenzoic acid", Bulletin of the Academy of Sciences of the USSR, Division of Chemical Science, Jan. 1, 1984.
Houbertz, et al., "Two-Photon Polymerization of Inorganic-Organic Hybrid Polymers as Scalable Technology Using Ultra-Short Laser Pulses", Coherence and Ultrashort Pulse Laser Emission, 2010, pp. 583-608.
Goel et al., Indian Journal of Chemistry; vol. 13; (1975); p. 387-389 (Reaxys, Mar. 5, 2020).

DEGRADABLE SILANE HAVING THIO AND AMINO GROUPS, SILICIC ACID POLYCONDENSATES AND HYBRID POLYMERS PRODUCED THEREFROM, USE THEREOF AND METHOD FOR PRODUCING THE SILANES

The present invention relates to new silanes as well as the production of biodegradable, organically modifiable silicic acid polycondensates (resin systems) and polymers thereof or therewith. The silanes according to the invention contain one or more substituents with short or longer hydrocarbon chains which are bonded to the silicon via oxygen, wherein longer chains are interrupted and/or substituted either by hydrolysable and/or enzymatically or otherwise cleavable groups within these chains and/or in such a way that the remaining hydrocarbon chains are water-soluble when these groups are cleaved. These substituents further contain thiol and/or amine groups. The silanes can be inorganically condensed and/or organically linked via an addition reaction with compounds having C=C double bonds or rings (radicals "X"). The reaction of silanes with several thiol and/or amino groups and of condensates from the silanes according to the invention with compounds with two or more C=C double bonds and/or rings leads to polymerization products. In accordance with the invention, the reaction partners with the radicals X also contain short or longer hydrocarbon chains, wherein longer chains are either interrupted by hydrolysable and/or enzymatically or otherwise cleavable groups within these chains and/or substituted in such a way that, in the event of a cleavage of these groups, the remaining hydrocarbon chains are water-soluble. They may be purely organic materials (monomers or oligomers) or condensed silane-based systems. The addition reaction or polyaddition/polymerization of thiol or amine and ene/ring opening components can be carried out, for example, thermally or redox-induced or by irradiation with visible and/or UV light. Possible processing methods for the production of structured materials are e.g. 2—or multi-photon polymerisation (2PP; MPP), digital light processing (DLP), stereolithography (STL), multi-jet modelling (MSM), polyjet printing (PJP), inkjet, UV lithography, nanoimprint and screen printing. The materials obtained in this way, and to a large extent also their precursors, are stable against irradiation with y rays so that they can be sterilised. By varying the proportion of inorganically cross-linkable units and/or of organically polymerisable/polyaddable units, the mechanical properties of the hybrid polymers produced from the silanes can be specifically adjusted so that they resemble those of natural, soft or hard tissue. They can be colonized by cell types such as endothelial cells and are therefore suitable, for example, as scaffolds for stabilizing and cultivating cells or tissue. When stored in buffers, the hybrid polymers decompose to a greater or lesser extent within a few weeks, producing toxic, mostly water-soluble, small-scale degradation products.

Due to the increasing life expectancy of people in Germany and the resulting undersupply of required donor organs, alternatives to organ transplantation from donor to recipient are urgently needed. The idea of what is known as tissue engineering came up in the 1990s. This interdisciplinary field has set itself the goal of improving or replacing the function of damaged tissue in order to ideally cultivate entire replacement organs and tissue from patients' own material. In order for cells to form functioning three-dimensional structures outside the body, they require a supporting matrix, which is realised in tissue engineering by artificial scaffolds. This matrix can either be colonised in vitro with cells that then grow, proliferate and finally form tissue that is subsequently transplanted, or it can be used directly in the body at the site to be treated to support the regrowth of surrounding tissue. In both cases, it is advantageous if the scaffold decomposes over time, thus creating space for tissue formation. For this reason, materials are primarily sought that are broken down and excreted by the body over time. In addition to tissue engineering, biodegradable polymers are also used as drug delivery systems for long-term medication, resorbable sutures or implants, e.g. for fixation after bone fractures.

However, the biodegradable polymers used so far are not free of disadvantages. Natural polymers are very expensive, have no adjustable degradation rates and only limited adaptable mechanical properties. In addition, they can provoke defence reactions of the body and/or do not offer good cell adhesion, which is necessary for tissue formation. Some representatives, such as PLA and PGA, are hydrolysed to acidic products such as lactic and glycolic acid, which additionally catalyse further polymer degradation (autocatalysis), making it difficult to predict the outcome. These products can also cause inflammatory reactions.

There are numerous processes for the production of scaffolds. For the production of highly complex structures, three-dimensional objects can be built up from several layers using computer-aided designs (CAD). Processes that make use of this technique are called rapid prototyping or solid free form processes. These methods can be used to create anatomically adapted scaffolds based on computed tomography (CT) or magnetic resonance imaging (MRI) data. Stereolithography is frequently used. In this technique, photopolymerization is initiated by electromagnetic radiation. A special case of stereolithography is two-photon polymerization (2PP). With this technique, ultra-fine structures can be produced at high resolution.

From a chemical point of view, scaffolds made of biopolymers produced by 2PP are well suited for the adequate imitation of the ECM (extracellular matrix) for tissue engineering. If degradable scaffold materials are used, the decomposition of the scaffold also provides the possibility to create space for cell migration and expansion.

For quite some time now, the search has been on for materials that can be used in medical technology, that can be specifically structured and that are biodegradable despite the polymerisation of organic groups, in particular (methacrylate and other) C=C double bonds. Among other things, biodegradable organically polymerizable hybrid polymers were considered for this purpose. These are usually modifications of known ORMOCER®s, i.e. of hydrolytically condensed silane compounds carrying organically crosslinkable groups. Some such ORMOCER®s have already been described as inherently biocompatible. Hybrid materials that are at least partially biodegradable under physiological conditions have also been reported. R. Houbertz et al. showed in *Coherence and Ultrashort Pulse Laser Emission,* 2010, 583 and in WO 2011/098460 A1 biocompatible materials that can be structured by 2PP. These materials either contain radicals bonded via Si—C bonds that carry organically polymerizable groups, or they are produced from a mixture of silanes with Si—C bonded, organically polymerizable radicals and organically polymerizable compounds. It has been shown that these materials are to a certain extent biodegradable by hydrolytic means and can be colonized by cells.

By introducing a hydrolytically cleavable Si—O—C bond, Obel et al. were able to integrate the organic residues containing polymerizable groups into the hybrid polymer structure in such a way that after polymerization, a widely degradable material is obtained. As can be seen from examples in WO 2016/037871 A1, such structured materials suffer weight loss in water as well as in buffers such as PBS. Using NMR spectroscopy, the hydrolytic cleavage of the structure at all cleavable sites and thus the degradation of the material could be detected. The partially degradable materials can be colonized by cells.

According to WO 2016/037871 A1, the organic cross-linking of the materials is usually achieved by the formation of polymethacrylate chains. These are not broken down during the hydrolytic cleavage of the materials and therefore remain in the degradation product.

The object of the present invention is to provide cross-linkable and cross-linked materials which, on the one hand, are accessible to closer cross-linking or are more closely cross-linked than purely organic materials and can therefore achieve mechanical properties which can essentially only be achieved with silicon-containing hybrid materials, but which, on the other hand, can be more completely degraded under physiological conditions than the hybrid materials known to date, whereby in particular the presence of longer, poorly cleavable and thus poorly degradable chain structures such as polymethacrylate chains is to be avoided. The materials according to the invention should also be sterilizable and biocompatible if possible, so that they are suitable for the manufacture of implants or scaffolds.

Figure 1:
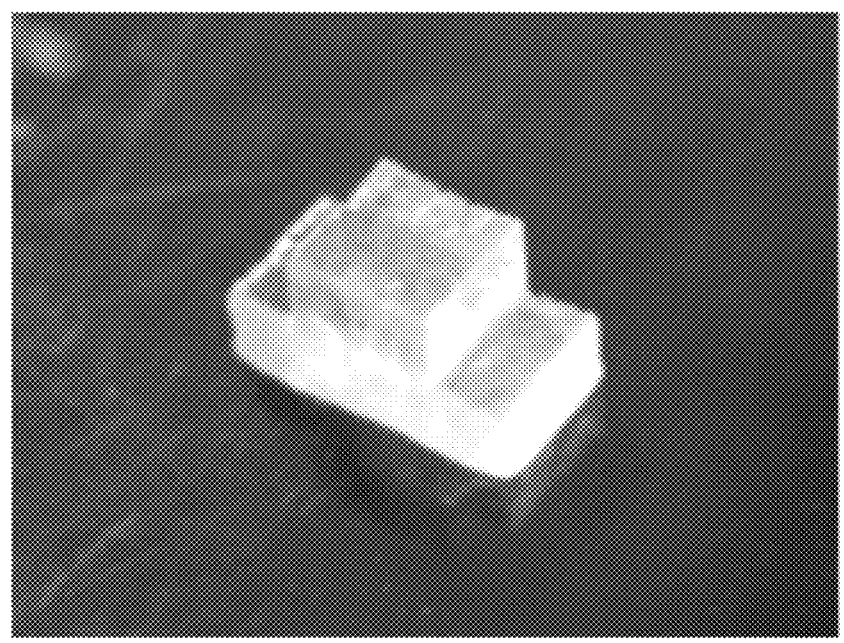
FIG. 1 shows a 3D shaped body printed with the aid of Digital Light Processing (DLP) and made of a material that is in accordance with the invention.

The present invention provides the subject matter of the following items [1] to [15]:

[1] A silane of formula (1)

$$R^1_a SiR_{4-a} \qquad (1)$$

where
the group $R^1$ or each of the groups $R^1$ independently is bound to the silicon via an oxygen atom,
has a straight or branched hydrocarbonaceous chain containing a plurality of elements, wherein
(a) each of the elements has not more than 8 consecutive carbon atoms, each of the elements of the hydrocarbonaceous chain being separated from the next element by a cleavable group; and/or
(b) the elements have one or more cleavable groups and all the hydrocarbonaceous chains remaining upon cleavage of that group or groups are water soluble,
wherein the cleavable groups are selected from ester, anhydride, amide, carbonate, carbamate, ketal, acetal, disulfide, imine, hydrazone and oxime groups,
has at least one thiol or a primary or secondary amino group,
the group R or each of the groups R is independently a hydrolytically condensable group, and
a is 1,2,3 or 4.

The thiol or primary or secondary amino group is a polyaddable group.

Preferably, in the silane of formula (1) at least one or each of the groups $R^1$ consists exclusively of organic components.

Preferably, the silane of formula (1) contains at least one thiol or primary or secondary amino group at the end of group $R^1$ remote from the silicon or, in the case of branched chains, at least one at end of group $R^1$ remote from the silicon.

The number of elements with characteristics (a) and (b) in a group $R^1$ is preferably two to ten, more preferably two to six.

Preferably, in the silane of formula (1), at least one of the elements of the hydrocarbon skeleton of the radical $R^1$ has a maximum of six, preferably no more than four and particularly preferably no more than three consecutive carbon atoms. It is particularly preferred that all elements of the hydrocarbon skeleton of the radical $R^1$ have a maximum of three consecutive carbon atoms. This can apply to all radicals $R^1$, so that the radicals $R^1$ in the silane contain exclusively elements of the hydrocarbon skeleton with a maximum of three consecutive carbon atoms.

[2] The silane of the formula (1) according to point [1], in which at least one of the elements of the hydrocarbon skeleton of the radical $R^1$ has a maximum of six, preferably a maximum of four, consecutive carbon atoms. A maximum of 3 successive carbon atoms is particularly preferred.

[3] The silane of formula (1) according to point [1] or [2], wherein at least one of the elements of the hydrocarbonaceous chain of the radical $R^1$ has one or both of the following features (i) and (ii):
(i) it is composed of alkylene units, the alkylene units being unsubstituted or at least one of the alkylene units being substituted with one or more groups selected from hydroxy, carboxylic acid, phosphate, phosphonic acid, phosphoric acid ester and tertiary amino and amino acid groups
(ii) it is interrupted by one or more oxygen atoms and/or sulphur atoms and/or sulphonyl groups

[4] The silane of formula (1) according to any one of points [1] to [3], wherein at least one of the elements of the hydrocarbonaceous chain of the radical $R^1$ (i) has at least one of the substituted alkylene units and (ii) is interrupted by one or more oxygen atoms and/or sulphur atoms and/or sulphonyl groups.

It is preferred that the substituents have oxygen atoms and the elements are interrupted by oxygen atoms.

Preferably, in the silane of formula (1) of the above points, each group R is a hydrolytically condensable group and/or alkyl, provided that at least one group R is a hydrolytically condensable group and no more than one group R is an alkyl group.

Preferably, in the silane of formula (1) of the above points a is equal to 2 or, in the case of a mixture of several such silanes, on average about 2.

[5] An organically modified silica polycondensate comprising a hydrolytic condensation product of a silane according to any one of [1] to [4] or a mixture of a plurality of said silanes.

[6] An organically modified, polymerized silicic acid polycondensate preparable by reacting the silane of the formula (1) according to one of points [1] to [4] and/or an organically modified silicic acid polycondensate according to point [5] with a compound

$$R^2(X)_b \qquad (2),$$

wherein
the group $R^2$ has a b-fold binding hydrocarbon backbone with a straight or branched hydrocarbonaceous chain containing one or more elements, wherein
(a) each of the elements has not more than 8 consecutive carbon atoms, each of a plurality of elements in the hydrocarbon chain being separated from the next element by a cleavable group; and/or (b) the elements have one or more cleavable groups and all the hydrocarbon chains remaining upon cleavage of that group or groups are water soluble at ambient temperature, wherein the cleavable groups are selected from ester, anhydride, amide, carbonate, carbamate, ketal, acetal, disulfide, imine, hydrazone and oxime groups, X is a group which, in the said reaction, undergoes an addition reaction with the at least one thiol or primary or secondary amino group of the radical $R^1$ of the silane of formula (1), and b is 2, 3, 4 or greater 4.

In the organically modified, polymerized silicic acid polycondensate, the element or at least one of the elements of the hydrocarbonaceous chain of the radical $R^2$ preferably has a maximum of six, more preferably no more than four and particularly preferably no more than three consecutive carbon atoms.

The compound (2) preferably does not contain any silicon.

The number of elements with characteristics (a) and (b) in a group $R^2$ is preferably two to ten, more preferably two to six.

The reactants of the reaction, i.e. the silane or the polycondensate on the one hand and the compound $R^2(X)_b$ on the other hand, can be used in any quantitative ratio to each other. The compound $R^2(X)_b$ can be used in a stoichiometric excess or shortfall to the silane or the polycondensate or in the same amount relative to the groups reacting with each other. If, for example, a complete reaction of the polyaddable groups, e.g. the thiol groups, in the silane or polycondensate is desired, the compound $R^2(X)_b$ can be added in excess. If, however, a complete conversion of the polyaddable groups, e.g. of the thiol groups, in the silane or polycondensate is not desired, the compound $R^2(X)_b$ can be added in excess. In this way, some of the polyaddable groups are not reacted and can then be used for the subsequent binding of molecules, e.g. enzymes, or, due to the polarity of the groups, only increase the solubility in a medium, for example.

In one embodiment, the organically modified, polymerized silicic acid polycondensate contains unreacted polyaddable groups of the silane or polycondensate, e.g. thiol groups.

In another embodiment, all polyaddable groups of the silane or polycondensate, e.g. thiol groups, have been reacted in the organically modified silicic acid polycondensate.

[7] The organically modified polymerized silica polycondensate according to point [6], which is the product of the reaction of the silane of formula (1) according to any one of points [1] to [4] with said compound (2), said product having been subjected to hydrolytic condensation after said reaction.

However, hydrolytic condensation can also take place before the conversion.

[8] The organically modified polymerized silica polycondensate according to [6] or [7], wherein the element or at least one of the elements of the hydrocarbonaceous chain of the radical $R^2$ has one or both of the following features (i) and (ii):
(i) it is composed of alkylene units, the alkylene units being unsubstituted or at least one of the alkylene units being substituted with one or more groups selected from hydroxy, carboxylic acid, phosphate, phosphonic acid, phosphoric acid ester and tertiary amino and amino acid groups (ii) it is interrupted by one or more oxygen atoms and/or sulphur atoms and/or sulphonyl groups.

[9] The organically modified, polymerized silicic acid polycondensate according to point [8], in which at least one of the elements of the hydrocarbonaceous chain of the radical $R^2$ (i) has at least one of the substituted alkylene units and (ii) is interrupted by one or more oxygen atoms and/or sulphur atoms and/or sulphonyl groups.

[10] The organically modified polymerized silica polycondensate according to any one of [6] to [9], wherein the group X of compound (2) has at least one organically polymerizable C═C double bond as a constituent of a group selected from an acrylate group, or methacrylate group or norbornene group, or an epoxy ring or spiro group.

[11] The organically modified polymerized silica polycondensate according to any one of [6] to [10], wherein both at least one of the elements of the hydrocarbonaceous chain of the radical $R^1$ and at least one of the elements of the hydrocarbonaceous chain of the radical $R^2$ have both of the following features (i) and (ii):
(i) it is composed of alkylene units, at least one of the alkylene units being substituted with one or more groups selected from hydroxy, carboxylic acid, phosphate, phosphonic acid, phosphoric acid ester and tertiary amino and amino acid groups
(ii) it is interrupted by one or more oxygen atoms and/or sulphur atoms and/or sulphonyl groups

[12] The organically modified polymerized silica polycondensate according to any one of points [6] to [11], wherein the compound $R^2(X)_b$ has a molecular weight of at most 3000 g/mol.

The compound $R^2(X)_b$ serves as a crosslinker and is therefore preferably a small molecule. The molecular weight is preferably at most 3000 g/mol, more preferably at most 2000 g/mol and most preferably at most 1000 g/mol. In certain embodiments, the compound has a molecular weight of at most 500 g/mol.

Preferably this low-molecular compound $R^2(X)_b$ does not contain silicon.

[13] The organically modified polymerized silica polycondensate according to any one of points [6] to [12], the ratio of the groups X of compound (2) to the sum of the thiol and amino groups in the silanes (1) and condensation products thereof being 0.1 to below 1.0.

Preferred in an organically modified, polymerized silicic acid polycondensate according to one of points [6] to [11], wherein the silicon-free compound $R^2(X)_b$ has a molecular weight of at most 3000 g/mol and the ratio of the groups X of compound (2) to the sum of the thiol and amino groups in the silanes (1) and condensation products thereof is 0.1 to below 1.0.

[14] The organically modified, polymerized silicic acid polycondensate according to one of the points [6] to [13] in the form of a shaped body.

[15] The use of the shaped body according to item [14] as a biologically or medically useful object or as an object for cell or tissue stabilisation or for cell or tissue cultivation.

The organically modified polymerized silica polycondensate according to the invention may further contain at least one filler, preferably selected from tricalcium phosphate, hydroxyapatite, bioglass and magnesium particles.

A further aspect of the present invention is a process for the preparation of the organically modified polymerized silicic acid polycondensate described in points [6] to [13], which process comprises reacting the silane of formula (1) according to one of points [1] to [4] and/or an organically modified silicic acid polycondensate according to point [5] with a compound $R^2(X)_b$ (2) described in points [6] to [13].

A further aspect of the present invention is an organically modified and optionally polymerized silicic acid polycondensate described in the present application, wherein, however, $R^1$ of the silane starting product does not have to have a hydrocarbonaceous chain with several elements, but may also contain only a single element. In this organically modified silica polycondensate or organically modified polymerized silica polycondensate, the silane starting product is thus correspondingly defined as follows:

Silane of the formula (1')

$$R^1_a SiR_{4-a} \tag{1'}$$

where
the group $R^1$ or each of the groups $R^1$ independently
is bound to the silicon via an oxygen atom,
has a straight or branched hydrocarbonaceous chain containing one or more elements, wherein
(a) each of the elements has not more than 8 consecutive carbon atoms, each of a plurality of elements in the hydrocarbonaceous chain being separated from the next element by a cleavable group; and/or
(b) the elements have one or more cleavable groups and all the hydrocarbonaceous chains remaining upon cleavage of that group or groups are water soluble, wherein the cleavable groups are selected from ester, anhydride, amide, carbonate, carbamate, ketal, acetal, disulfide, imine, hydrazone and oxime groups,
has at least one thiol or a primary or secondary amino group, the group R or each of the groups R is independently a hydrolytically condensable group, and
a is 1,2,3 or 4.

An organically modified silica polycondensate or organically modified polymerised silica polycondensate referred to in the present application should thus always include one obtained by reaction with a silane of formula (1') or a condensation product thereof.

The present invention differs from the subject matter of WO 2016/037881 A1. In the process of WO 2016/037881 A1 the C=C double bonds are contained in the silane or the polycondensate. Such C=C double bonds are contained in acrylates, for example. When reacting with a thiol, the thiol has to be used in excess to avoid unreacted and therefore toxic acrylate. After the reaction, the excess thiol must be washed out. In the present invention, however, the thiol is contained in the silane or the polycondensate. If the acrylate-containing crosslinker is added in a lower amount, it is completely converted. A subsequent removal of unreacted crosslinker is not necessary.

These fundamental differences result in the following advantages (1) to (7) of the present invention:

(1) In the process of WO 2016/037871 A1, thiol must be added in excess to ensure that toxic acrylate is completely converted. The process of WO 2016/037871 A1 is thus fundamentally restricted. This restriction does not apply to the present invention.

(2) Since thiol does not have to be added in excess, there is no need to remove the excess thiol after the reaction.

(3) Undesired intramolecular cross-linking can be avoided by using a shortage of cross-linking agent, e.g. acrylate.

(4) The reaction sequence of condensation and subsequent polymerisation is less restricted compared to WO 2016/037871 A1. If condensation is carried out first and then polymerization, not all of the polymerizable groups contained in the polycondensate may be converted due to steric hindrances. In the case of the present invention, however, this is not problematic, since the polyaddable group contained in the polycondensate is a non-toxic thiol, whereas in the case of WO 2016/037871 A1 it may be a toxic acrylate.

(5) A voluminous cyclic group containing C=C double bonds can also be used as a crosslinker in the present invention. Conversely, such a voluminous cyclic group would be problematic as a component of a polycondensate for steric reasons and would also increase the viscosity excessively.

(6) If the acrylate-containing crosslinker is added in a lower amount, unreacted thiols remain in the polycondensate. These can increase the polarity and thus the compatibility with an aqueous medium, or they can represent a suitable functionalization for binding further groups, e.g. bioactive substances such as enzymes, to the finished product, i.e. the polymerized polycondensate.

(7) In the present invention, silicon tetraacetate can be used as a starting compound. The use of this compound leads to an almost complete transesterification during the organic modification and is therefore advantageous. In contrast to the state of the art, the hydrolytic condensation is then carried out at elevated temperature, for example at 90° C. (cf. example C), in order to completely separate the acetate groups from the silicon tetraacetate. This is advantageous because remaining acetate groups react acidically and are therefore cell toxic. The use of silicon tetraacetate is therefore only possible if the hydrolytic condensation can take place at elevated temperature. Since acrylates, which are temperature sensitive, are not contained in the silanes but in the crosslinker, the hydrolytic condensation can be carried out at elevated temperature. In contrast, the silanes of the state of the art contain acrylates, which precludes the use of an elevated temperature and thus the use of silicon tetraacetate.

The problem underlying the invention is solved by providing a silane of formula (1)

$$R^1_a SiR_{4-a} \tag{1}$$

and (inorganically crosslinked) condensates and/or (organically crosslinked) polymers prepared from or with (1),
wherein in the compounds of formula (1)
the group $R^1$
is bound to the silicon via an oxygen atom,
preferably has a purely organic structure, i.e. contains no silicon atoms,
a straight or branched hydrocarbonaceous chain of variable length (preferably free of cycles) comprising a plurality of elements, wherein
(a) each of the elements has not more than 8, preferably not more than 6, more preferably not more than 4 and most preferably not more than 2 or 3 consecutive carbon atoms, each of the elements of the hydrocarbonaceous chain being separated from the next element by a cleavable group, and/or
(b) the elements have one or more cleavable groups and all the hydrocarbonaceous chains remaining upon cleavage of said group(s) are water-soluble,
wherein said cleavable groups are selected from ester, anhydride, amide, carbonate, carbamate, ketal, acetal, disulfide, imine, hydrazone, and oxime groups, and wherein, if there is more than one of the above cleavable groups, they may be the same or different in any way, has at least one thiol or primary or secondary amino group which is preferably located at the end of group $R^1$ remote from the silicon or, in the case of branched structures, at least at one end of group $R^1$ remote from the silicon, the group R is a hydrolytically condensable group, preferably selected from groups having the formula R'COO— or R'O— or hydroxy, or a group $R^1$, wherein $R^1$ is alkyl, preferably $C_1$ to $C_6$ alkyl and more preferably methyl or ethyl, with the proviso that at least one group R is a hydrolytically condensable group and no more than one group R is an alkyl group, and a is 1, 2, 3 or 4, preferably 2, 3 or 4 and more preferably 2, and is on average about 2 when several such silanes are mixed.

If a is greater than 1, the radicals $R^1$ can be identical or different. If 4-a is greater than 1, the radicals R can be the same or different.

The bond of $R^1$ to the silicon atom can be in the form of the grouping C—O—Si or C(O)—O—Si. Thus, $R^1$ is addressed in the former case as alkoxy, in the latter case as acyloxy.

As defined above, the hydrocarbon chain of $R^1$ in variant (a) must not have more than 8 consecutive carbon atoms, but preferably less than 8; if there are 8 or less than 8 in total, the presence of a cleavable group is optional. If the number is greater, there must be cleavable groups by which the hydrocarbonaceous chain(s) is/are interrupted such that no more than 8, but preferably even fewer, carbon atoms follow one another. Even if the total number of carbon atoms in the hydrocarbonaceous chain does not exceed 8, it may optionally (and preferably) be divided into smaller elements by means of cleavable groups. The shorter the element(s) made up of hydrocarbon groups, the better the degradability, because the shorter the fragments produced during degradation.

According to variant (b), the hydrocarbon chain of $R^1$ may also be longer than defined for (a); in this case, however, groups must be present which can be cleaved and which, possibly together with suitable (hydrophilic) substituents on the chain, cause the cleavage product(s) of the hydrocarbon chain to be water-soluble. According to the invention, "water solubility" should be understood to mean that the cleavage products are water-soluble at their ambient temperature. Since they can accumulate in the human body, the water solubility should therefore be at least 37° C., but preferably the cleavage products are already water-soluble at "normal" ambient temperature, i.e. at 25° C. Preferably, a cleavage product is considered "water-soluble" if it is present as an ion at 37° C. and a physiological pH value of 7.4. An example is the carboxy group after cleavage of an ester. More preferably, the cleavage product has a pKS value at 37° C. of less than 6.4 or higher than 8.4. Although such cleavage products are not necessarily themselves further degradable, their solubility means that they can be absorbed at the site of their origin, for example in the body, and/or transported away from there and washed out.

Variant (a) is preferred over variant (b).

The hydrocarbon chain of $R^1$ is preferably composed of alkylene units. Their members may, but need not, be substituted with one or more substituents, the substituents preferably being selected from hydroxy, carboxylic acid, phosphate, phosphonic acid, phosphoric acid ester, tertiary amino groups, and amino acid groups. Such substituents are often desirable for variant (b).

The hydrocarbon chain of $R^1$ may still be interrupted by oxygen atoms (ether groups), sulfur atoms (thioether groups) or sulfonyl groups (—S(O)2—) within the single element or elements.

The cleavable groups of $R^1$ are mostly hydrolysable, i.e. hydrolytically cleavable groups. These include, for example, the ester and anhydride groups and usually the ketal, acetal, disulfide, imine, hydrazone and oxime groups. In some cases, the cleavable groups are enzymatically cleavable instead or in addition, such as the ester, amide, carbonate, and carbamate groups. As far as the mentioned groups are cleavable in other ways, this is, according to the invention, of course advantageous, because then other cleavage reactions for degradation are possible. Ester groups are preferred among the cleavable groups.

In a first particularly preferred embodiment, the silane is one which has two or, in the case of a mixture of several silanes, about two acyl radicals per silicon and two or about two $R^1$ radicals.

In an embodiment which can be combined with it or is independent thereof, the radical $R^1$ is an alkoxy radical substituted by a thiol group and preferably having 2 to 6 carbon atoms. The thiol group may be located at the end of $R^1$ remote from the silicon; instead, a non-terminal $CH_2$ group may be substituted with the thiol group, this radical preferably being located as far away as possible from the silicon atom.

In an alternative embodiment which can be combined with or is independent of the first particularly preferred embodiment, the radical $R^1$ is branched and has two thiol groups which are preferably located at the ends of $R^1$ remote from the silicon.

In a further embodiment which can be combined with or is independent of the first particularly preferred embodiment, the radical $R^1$ is straight-chain; its hydrocarbon chain has 4 to 20 carbon atoms. This chain is interrupted by one or more ester groups (—C(O)O—, which may point in either of the two possible directions); the individual elements formed in this way may also be interrupted by sulphur and/or oxygen atoms. A thiol group is preferably located at the end of the chain remote from the silicon. This thiol group may be the only thiol group or one of several thiol groups on the radical $R^1$.

In further embodiments of the invention, the aforementioned preferred embodiments are modified in such a way that the thiol groups are replaced by amino groups, preferably primary amino groups. It should be noted that these react with C═C groups analogously to a thiol-ene reaction only if the double bond of the reaction partner is present in activated form, for example as an acrylic or methacrylic group (e.g. as a (meth)acrylate group).

Usually, thiol addition is performed in the presence of an initiator, as known from the state of the art, while amine addition is also possible without initiator.

The silanes of formula (1) are accessible in different ways. For example, they can be prepared by reacting a silane of the formula $R^x{}_a SiR_{4-a}$ (3), where a and R have the meanings given for formula (1) and $R^X$ means $R^3COO$—, where $R^3$ is $C_1$-$C_6$-alkyl, preferably methyl, with a compound $R^1$—OH, where $R^1$ has the meaning given for formula (1). Depending on the quantitative ratios used, one or more of the acyl groups $R^3COO$—is/are displaced by $R^1$—O—. It is advantageous if both the radicals $R^x$ and the radicals R are acyl radicals, for example acetyl radicals. If two moles of $R^1OH$ per mole of silane with four acyl radicals are added, a mixture with on average two radicals $R^1$ per silane atom is formed.

The silanes or mixtures of these silanes according to the invention can be inorganically condensed, e.g. by a hydrolysis reaction. This produces an inorganically cross-linked condensate (organically modified silicic acid polycondensate) with many thio or amino groups, which can be further reacted with C=C double bond-containing compounds or ring-containing compounds which are attacked by thiols or amines under ring opening to form an inorganically and organically cross-linked product (polymer). In a special version, either further known, hydrolytically condensable silanes and/or alkoxy compounds of heteroatoms such as B, Al, Zr, Zn or Sn are added to the silanes according to the invention during the hydrolysis reaction. If alkoxy compounds of heteroatoms are added, the condensate must also be addressed as an organically modified silicic acid heteropolycondensate. If such additives are missing, a silicic acid homopolycondensate is formed. The term "silicic acid polycondensate" should include both hetero and homocondensates.

The task of the invention in this sense is further solved by providing a silane polymer (an organically modified, polymerized silicic acid homo- or heteropolycondensate), obtainable by reacting the silane of formula (1), a mixture of several such silanes and/or a (homo— or hetero—)condensate thereof with a compound $R^2(X)_b$ (2),
wherein
  $R^2$ has a b-fold binding hydrocarbon backbone comprising a straight or branched hydrocarbonaceous chain of variable length (preferably annular) with one or more elements, wherein
    (a) each of the elements has not more than 8, preferably not more than 6, more preferably not more than 4 and most preferably not more than 2 or 3 consecutive carbon atoms, wherein each of a plurality of elements of the hydrocarbonaceous chain is separated from the next element by a cleavable group, and/or
    (b) the elements have one or more cleavable groups, and any hydrocarbonaceous chains remaining upon cleavage of said group(s) are water soluble,
  wherein the cleavable group is selected from ester, anhydride, amide, carbonate, carbamate, ketal, acetal, disulphide, imine, hydrazone and oxime groups, wherein, if several of the above cleavable groups are present, they may be selected the same or different in any way,
X is a group which undergoes an addition reaction with the thiol or primary or secondary amino group of the radical $R^1$ of the silane of formula (1), this group containing a C=C double bond or a ring which is opened in the addition reaction, and
b is 2, 3, 4 or greater 4.

As defined above, each element of the hydrocarbon chain of $R^2$ in variant (a) must not have more than 8 consecutive carbon atoms, preferably even less. If there are 8 or less than 8 in total, the presence of a cleavable group is optional. If the number is greater, there must be cleavable groups by which the elements of the hydrocarbonaceous chain are interrupted in such a way that no more than 8, but preferably even fewer, carbon atoms follow one another. Even if the total number of carbon atoms in the hydrocarbonaceous chain does not exceed 8, this may optionally be subdivided into smaller elements by cleavable groups. In case the hydrocarbon skeleton of $R^2$ has more than one hydrocarbonaceous chain (e.g. if compound (2) is a silane or a siloxane, i.e. a silicic acid polycondensate), this condition applies to each of the chains present. The shorter the element(s) made up of hydrocarbon chains, the better the degradability, because the shorter the fragments produced during degradation.

According to variant (b), the hydrocarbon chain (or all hydrocarbon chains, see previous section) may also be longer than defined for (a); in this case, however, there must be groups which can be cleaved and which cause the cleavage products of the hydrocarbon chains to be water-soluble. According to the invention, "water solubility" should be understood to mean that the cleavage products are soluble in water at their ambient temperature. Since they can accumulate in the human body, the water solubility should therefore be at least 37° C., but preferably the cleavage products are already water-soluble at "normal" ambient temperature, i.e. at 25° C. Preferably, a cleavage product is considered "water-soluble" if it is present as an ion at 37° C. and a physiological pH value of 7.4. An example is the carboxy group after cleavage of an ester. More preferably, the cleavage product has a $pK_s$ value at 37° C. of less than 6.4 or higher than 8.4. Although such cleavage products are not necessarily degradable, their solubility means that they can be absorbed at the site of their origin, for example in the body, and/or transported away from there and washed out.

It is particularly preferred to react a silane or silicic acid polycondensate (1), variant (a), with a (preferably purely organic) molecule or a silane/siloxane (2) in which $R^2$ satisfies the conditions of variant (a).

The hydrocarbon skeleton of $R^2$ preferably contains mainly or exclusively alkylene units. Their members may, but need not, be substituted with one or more substituents, the substituents preferably being selected from hydroxy, carboxylic acid, phosphate, phosphonic acid, phosphoric acid ester, phosphoric acid tertiary amino and amino acid groups. Such substituents are often desirable for variant (b). The hydrocarbon skeleton of $R^2$ may consist of such alkylene units.

The hydrocarbon chain of $R^2$ may still be interrupted within the single element or elements by oxygen atoms (ether groups), sulfur atoms (thioether groups) or sulfonyl groups (—S(O)2—).

The cleavable groups of $R^2$ can be hydrolysable, i.e. hydrolytically cleavable groups. These include, for example, the ester and anhydride groups and, as a rule, the ketal, acetal, disulfide, imine, hydrazone and oxime groups. It is also possible to use cleavable groups which are enzymatically cleavable, such as the ester, amide, carbonate and carbamate groups. The groups can also be cleavable both hydrolytically and enzymatically. As far as the mentioned groups can be cleaved in other ways, this is, according to the invention, of course advantageous, because then other cleavage reactions for the degradation are possible. Ester groups are preferred among the cleavable groups.

With the groups X of compound (2), the thiols or amino groups of the silanes (1) or the condensates formed by hydrolysis thereof or with them ("silicic acid polycondensates") undergo an addition reaction in the manner of a thiol-ene reaction.

The groups X in a first version of the invention have terminal polyaddable C=C groups. These can be, for example, acrylic or methacrylic groups (e.g. acrylate and/or methacrylate groups), allyl ester, vinyl ester, allyl ether, vinyl ether groups, propenyl ether, maleimide or N-vinyl amide groups. Furthermore, these groups include cycloolefinic, preferably bicycloolefinic and particularly preferably unsubstituted or substituted norbornenyl groups, preferably of the following formula:

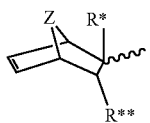

wherein R* and R** can independently be H or an (optionally functionalized) organic radical, $R^2$ can further be an organic radical containing C=C groups, and Z is an oxygen bridge or the radical —$(CHR^1)$—$_n$, wherein $R^1$ is H or an (optionally functionalized) organic radical and n can be 1, 2, 3, greater than 3 to about 20 or even greater.

In an alternative configuration of groups X, these are ring-opening systems. These are e.g. epoxy groups and reactive cyclic ether groups with e.g. 4 ring members (oxetane group). The glycidyl or oxetane group can be unsubstituted or substituted. Furthermore, cyclic carbonate groups as described for example in DE 4423811.8, spiroesters/spiroorthoesters (the latter are disclosed for example in DE 4125201.2) as well as spiroorthocarbonates and bicyclic orthoesters can be used.

Compounds (2) may be purely organic compounds (preferably monomers or oligomers), as mentioned above. Examples are diols or triols such as glycerol esterified with at least two methacrylate residues and their reaction products with dicyclopentadiene. Alternatively, at least one hydrolyzable silyl group may be integrated into the hydrocarbon backbone of (2). This means that (2) can be a silane which has radicals bonded to the silicon essentially or exclusively via oxygen, at least two of which carry the said group X or at least one of which carries two of the said groups X, or corresponding hydrolytic condensates (silicic acid polycondensates) of such silanes can be used which also have radicals bonded to the silicon essentially or exclusively via oxygen. These polycondensates can then generally carry more than two groups X in total, for example one or two groups X per silicon atom; more or less is of course also possible. Silanes and silane condensates of WO 2016/037871, which carry C=C double bonds and especially (meth-)acrylic groups, are particularly suitable in this context.

If a silane (1) which has not yet been hydrolytically condensed is reacted with compound (2) and/or compound (2) is a silane which has not (yet) been hydrolytically condensed, subsequent hydrolytic condensation preferably takes place after the reaction of (1) with (2). The rule, however, is to start from silanes (1) which have already been hydrolytically condensed, i.e. a material which is already inorganically crosslinked, and to react it either with a purely organic compound (2) or a hydrolytic condensate of a silane of the formula (2).

The ratio between the groups X of compound (2) and the thiol or amino groups of the silanes (1) or the silane condensates formed from them is variable. Preferably, the groups are used in a 1:1 ratio or the thiol or amino groups are used in a lower ratio to the groups X. The latter is favourable, for example, if the groups X are capable of homopolymerisation, i.e. if they are (meth)acrylic groups for example. In this case, in addition to the addition reaction of the thiol or amino groups, a homopolymerization reaction of the groups X with each other takes place at the same time—even if only to a minor extent. However, the groups X of compound (2) can also be added in a lower amount. The ratio of the groups X of compound (2) to the sum of the thiol and amino groups of the silanes (1) and any silane condensates formed from them can be 0.1 to below 1.0, preferably 0.2 to 0.9. Alternative ratios are 0.5 to 0.9 or 0.1 to 0.5. This avoids unreacted crosslinker, which is toxic in the case of acrylate, remaining in the reaction mixture and possibly having to be removed. Furthermore, in this case, unreacted polyaddable groups of the silanes (1), namely thiol or amino groups, are present which, due to their polarity, promote the adhesion of cells, for example, or are suitable for the covalent bonding of further molecules. The polyaddable groups of the silanes (1) thus become functional groups in the organically modified, polymerized silicic acid polycondensate.

Curing by the thiol-ene reaction can take place via two different mechanisms: Radical thiol-ene reaction and thiol-Michael addition. The radical mechanism is initiated by a radical initiator (thermal and/or photoinduced and/or redox-induced). Especially non-activated C=C double bonds (such as vinyl, allyl, norbornenyl groups) are suitable for this type of initiation. In order to be able to initiate thiol-Michael addition (especially with activated C=C double bonds, such as (meth)acrylate groups) in a specific place and/or time, photobases can be used, since thiol-Michael addition is base-catalyzed. Photobases release a base upon exposure to light and can thus initiate the Thiol-Michael addition. Photobases can therefore also be used in the production of polymerized compounds according to the invention. The production and use of photobases is described in the literature.

If photochemical work is performed, irradiation can be carried out with visible and/or UV light. Combinations of different conversions, for example photochemical and thermal or a combination of redox-induced with e.g. photo induced or thermal curing are also possible. Thus, possible processing processes for structured materials are e.g. the 2—or multi-photon polymerisation (2PP/MPP), the Digital Light Processing (DLP) and the Stereolithography (STL). With suitable reaction control (avoidance of an excess of compound (2) if it should be purely organic), only products are obtained which are monomer-free and therefore cannot be allergenic.

The polymerisation reaction can take place from a (usually liquid or pasty) resin mass (in bulk) containing the components. For structured products such as scaffolds or implants—but not only for these—the polymerization can take place in a bath, for example, in which the resin material is presented as a mass (liquid or pasty) and polymerized in a desired form or pattern (VAT polymerization). For this purpose, an exposure is preferably carried out with laser light in a known manner, e.g. a 2—or multi-photon polymerisation ("TPA processing"), as described for example in WO 2011/098460 A1. Instead, structuring with other VAT polymerization techniques can of course also be carried out, e.g. by the so-called DLP process, in which the desired shape is built up layer by layer by sequential exposure. In this process, the component adheres to a building platform which hangs upside down in the resin mass. The bath with the resin mass is irradiated from below and the resulting component is lifted layer by layer. The non-polymerised material can then be washed away. If a printing technique such as Multi Jet Modelling (MSM), Poly Jet Printing (PJP), Ink Jet is used, only the required material is printed layer by layer on top of each other, so that washing off is not necessary.

If scaffolds are to be produced, the pores required for the growth of the biological material can be created directly in the shaped body with the help of the above-mentioned structuring techniques. With DLP, pores can be created primarily in the μm range, with TPA also below this, i.e. in the nm range.

The compounds according to the invention, i.e. the silane, the organically modified silicic acid polycondensate and the organically modified, polymerised silicic acid polycondensate, can thus also be used for the production of framework structures (scaffolds). Thus, the shaped body which can be produced according to the invention can also be a framework structure.

The reaction of (1) with (2) produces a possibly chain-shaped or ring-shaped, but usually cross-linked product (hybrid polymer), depending on the number of residues $R^1$ and $R^2$. Depending on the cleavable groups selected, this is usually degradable in various ways, but of course especially hydrolytically or enzymatically, due to the fact that both components, (1) and (2), usually have only short hydrocarbon chains, which may be separated from each other by corresponding hydrolytically or enzymatically and possibly otherwise cleavable groups. Instead or in addition, the hydrocarbonaceous chains remaining when the cleavable groups are cleaved can be water-soluble—at least at the temperature of the human body, but preferably at normal ambient temperature, i.e. approx. 25° C. When stored in buffers, the hybrid polymers decompose to a greater or lesser extent within a few weeks, producing toxicly harmless, mostly water-soluble, small-scale degradation products. In addition, both the organic network structure and the oxygen bridge between the organic substituent and the silicon atom are cleaved. Thus, the hybrid polymers according to the invention are suitable for the production of completely biodegradable or resorbable implants or scaffolds with mechanical data adapted to the respective application. The silanes and hybrid polymers according to the invention are also suitable for use in bone cements.

The materials obtained in this way, as well as some of their precursors, are—in contrast to some materials such as (meth-)acrylate materials—stable against irradiation with γ rays (preferred method, as it is easy to handle), so that they can be sterilized. Sterilisation of the shaped bodies produced is often essential, particularly in the medical field, e.g. if they are to serve as bone replacements or scaffolds. And not only the through-polymerized products of the invention are sterilizable, but also the silane/silicic acid polycondensates (1) and many crosslinkers (2), so that the starting materials for the crosslinked products can already be sterilized without further ado.

By varying the proportion of inorganically crosslinkable units and/or of organically polymerizable/polyaddable units, the mechanical properties of the hybrid polymers produced from the silanes can be specifically adjusted so that they resemble those of natural, soft or hard tissue. They can be colonized by cell types such as endothelial cells and are therefore suitable, for example, as scaffolds for stabilizing and cultivating cells.

In the following, the invention shall be explained in more detail on the basis of a schematic representation of a silane of formula (1) according to the invention. Shown is one of the substituents $R^1$ on the silane (1), bonded to the silicon atom via an oxygen atom. This oxygen atom is here part of a glycerol unit. The two remaining alcohol groups of these units are esterified with thioglycolic acid groups. The group is thus branched and has thiol groups at its ends remote from the silicon atom which can be organically crosslinked with a compound containing two or more C=C double bonds or rings (hereinafter generally referred to as "multi-ene") in the sense of a thiol-ene-polyaddition.

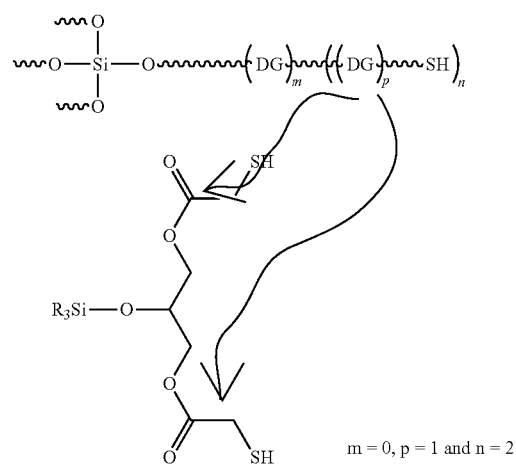

The two exemplary carboxylic acid ester groups present in this group are accessible to hydrolysis and are designated DG here. Under hydrolysis conditions, the Si—O bond is also cleaved. This provides a material which can be degraded to silicon at the coupling site of the organic group.

In the following, the associated networking component (2) is presented in a general form and as an example of a multi-ene.

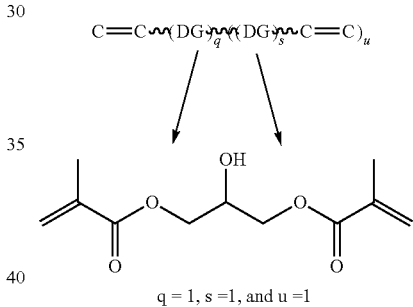

In this case, the multi-ene contains two hydrolytically cleavable carboxylic acid ester groups, which in turn are referred to here as DG. Furthermore, two terminal methacrylate groups are present.

The organic polymerisation leads to the organically crosslinked structure shown below.

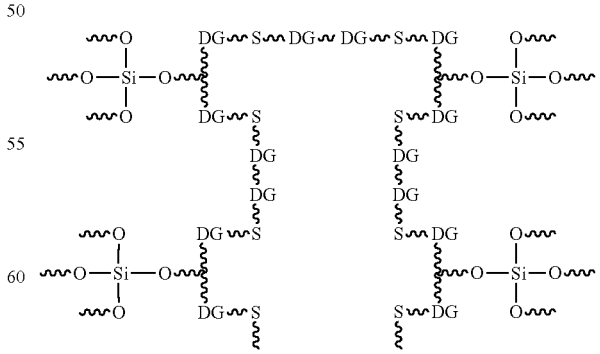

From the above explanations, it can be directly seen that the provision of only short hydrocarbon chains, optionally interrupted by oxygen atoms, sulphur atoms, ester, amide, carbonate, carbamate, ketal, acetal, disulphide, imine, hydrazone and/or oxime groups, in the hydrolytic/enzymatic/etc. degradation leads to small-molecular products which are generally physiologically harmless as such. Thus the entire organic portion of the hybrid polymer can be broken down into small-molecular products. In the above example, glycerol and a dicarboxylic acid containing a thioether are formed, which are toxicologically harmless. The remaining, essentially inorganic residues are likely to be mainly fragments with Si—O—Si linkages, which are externally coated with hydroxy groups.

By incorporating additives such as fillers prior to organic crosslinking, the material properties of the hybrid polymers according to the invention can be influenced in many ways. Fillers of various forms, which themselves are degradable or degradable, such as tricalcium phosphate, hydroxyapatite, magnesium particles or bioglasses (particles composed of a glass base of e.g. $SiO_2$, $Na_2O$ or $K_2O/CaO$/phosphorus compounds such as $P_2O_5$, which gradually dissolve under certain environmental conditions, see Bioactive Glasses, Fundamentals, Technology and Application of the Royal Society of Chemistry) are particularly suitable for this purpose. Such fillers and other additives can be used to influence the degradation behavior, mechanical properties such as mechanical stability (e.g. by increasing the modulus of elasticity, etc.), osteoconductivity and inductance (e.g. in bone scaffolds), biocompatibility and/or the generation of pores. Pores can be created either directly, by structuring the shaped body accordingly, or by containing degradable or degradable fillers in the organically cross-linked material, which degrade rapidly after the shaped body, such as a scaffold, is inserted into the body. A local acceleration of degradation can also be achieved, for example, by using a filler that provides basic degradation products when it breaks down. Bioglasses, for example, are suitable fillers for this purpose. Of course, non-degradable fillers can also be added in order to influence, and in particular to increase, the mechanical stability of a shaped body produced from the material according to the invention. It is, of course, advantageous if such fillers are themselves small particles.

Photobases and photoacids can be integrated into the material systems as triggers in order to initiate degradation or to increase the degradation rate of a sample at a later time by catalyzing the cleavage of degradable groups by the acids or bases released by exposure of the sample. The preparation and appropriate use of photobases and photoacids is described in the literature.

The use of photobases is advantageous because they can be used not only, as described above, in the synthesis of the compounds of the invention, but also in their degradation.

Furthermore, it is possible to add proteins to the material according to the invention which have the properties of growth factors (e.g. bone morphogenic proteins) or osteoinductive mediators in order to further improve the suitability of the material as a scaffold in tissue engineering. Such proteins can be used as an additive or directly bound to components (1) and/or (2) and thus be used as their constituents. In the latter case, of course, the conditions specified for them must be observed (e.g. binding of the proteins via an ester group; linking of the individual amino acid via acid amide groups).

The use of the materials according to the invention covers, inter alia, use in the form of bulk materials, fibres, composites, cements, adhesives, casting compounds, coating materials, use in (reaction) extruders, in the field of multi-photon polymerisation. They are suitable for a wide variety of purposes. In particular, their use for medical applications (e.g. as implants, bone replacement materials, bone cement) is important. However, the use in other applications outside the body is also possible.

In the following, the invention will be explained in more detail by means of examples.

A. Preparation of a compound $R^1$—OH ($S_3$):

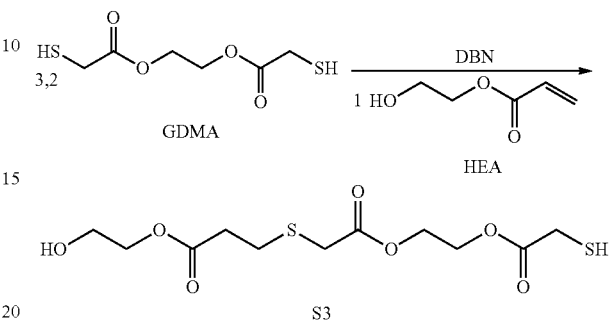

To 18.00 g (155.01 mmol, 1.0 equivalent) of 2-hydroxyethyl acrylate (HEA), 0.07 g (0.06-wt %) of 1.5-diazabicyclo[4.3.0]non-5-ene (DBN) was added. While stirring, 104.32 g (496.04 mmol, 3.2 equiv.) of glycol dimercaptoacetate (GDMA) was added and the reaction mixture was stirred for 24 h at room temperature. The resulting product mixture was purified by column chromatography (dichloromethane/ethyl acetate 10:1) and the desired product HEA-GDMA (S3) was obtained with a yield of 38.01 g (74%).

B. Preparation of silanes of the formula (1)

B1. transesterification of a compound $R^1$—OH (here: HS—$CH_2$—$CH_2$—OH, $S_1$) with a silane of the formula (3) (here: $Si(OAc)_4$) to form a silane of the formula (1) (product $U_1$):

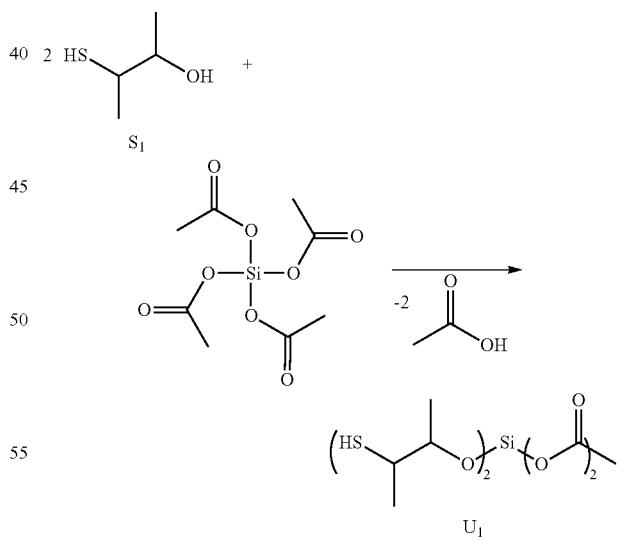

37.33 g (141.26 mmol, 1.0 equivalent) of silicon tetraacetate were mixed with 30.00 g (282.51 mmol, 2.0 equivalent) S1 (2-mercapto-3-butanol). This reaction mixture was first stirred for 1 min at room temperature and then heated to 50° C. at 15 mbar for 1.5 h. The pressure was then reduced to 1 mbar for another 1.5 h. The reaction mixture was freed from volatile components for 8 h in an oil pump vacuum and filtered with the help of compressed air through a filter with 15 μm pore size. In the resulting product mixture U1, on average two alkoxy groups and two acetoxy groups are bonded to a silicon atom. Yield: 49.62 g (99%).

B2. Transesterification of a compound $R^1$—OH (here: trimethylolpropane-di(1-mercapto-ethyl ester), S2) with a silane of the formula (3) (here Si(OAc)$_4$) to give a silane of the formula (1) (product U$_2$)

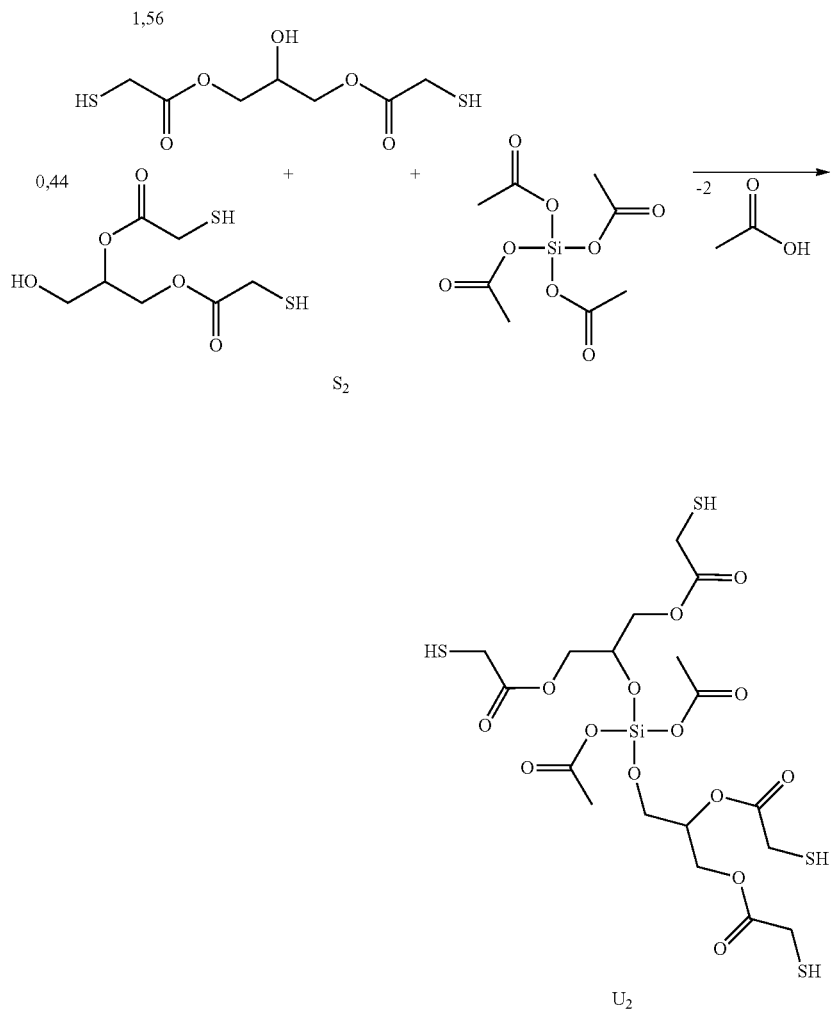

27.49 g (104.04 mmol, 1.0 equivalent) of silicon tetraacetate was mixed with 50.00 g (208.07 mmol, 2.0 equivalent) of S2 (isomer mixture). This reaction mixture was first stirred for 1 min at room temperature and then heated to 80° C. at 50 mbar for 10 min. The pressure was then reduced to 1 mbar for another 2.5 h. The reaction mixture was freed from volatile components for 8 h in an oil pump vacuum and filtered with the aid of compressed air through a filter with 15 μm pore size. In the resulting product mixture U2, on average two alkoxy groups (based on different proportions of the isomers of S2) and two acetoxy groups are bound to a silicon atom. Yield: 63.80 g (98%). It should be noted that the mixing ratio of the isomers of S$_2$, in the example 1.56:0.44 mol, can be chosen at will.

B3. Transesterification of a compound $R^1$—OH (here: compound from preparation A, S$_3$) with a silane of the formula (3) (here Si(OAc)$_4$) to give a silane of the formula (1) (product U$_1$):

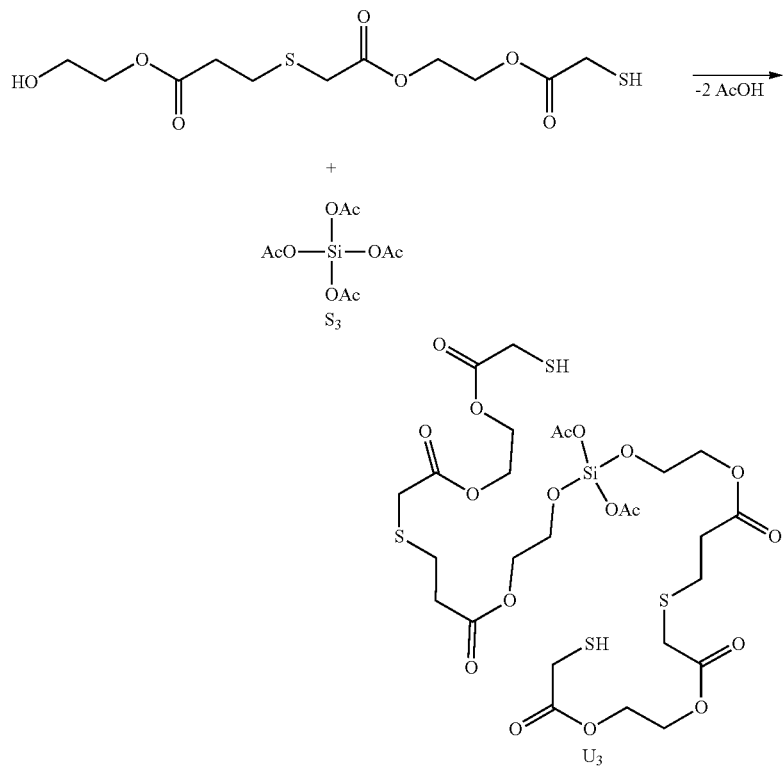

13.76 g (52.08 mmol, 1.0 equivalent) of silicon tetraacetate was mixed with 34.00 g (104.17 mmol, 2.0 equivalent) of S3. This reaction mixture was first stirred for 1 min at room temperature and then heated to 80° C. at 15 mbar for 15 min. The pressure was then reduced to 1 mbar for another 3 h. The reaction mixture was freed from volatile components for 8 h in an oil pump vacuum and filtered with the aid of compressed air through a filter with 15 µm pore size. In the resulting product mixture U3, on average two alkoxy groups and two acetoxy groups are bonded to a silicon atom. Yield: 34.55 g (98%).

C. Hydrolysis+condensation—Production of the resins H1, H2 or H3:

The product mixtures U1, U2 and U3 were then hydrolysed in several steps at 90° C. To this end, enough water was added so that one water molecule was added to every fifth remaining bound acetoxy group (but at least one water molecule to every twentieth acetate group present before hydrolysis). After the addition of water, the mixture was stirred at 90° C. for 1 minute and then the volatile components were removed in an oil pump vacuum. The degree of hydrolysis of the Si—OAc and Si—OAlk groups was checked by $^1$H-NMR spectroscopy. The water addition was repeated until essentially all acetate groups were removed from the mixture. No cleavage of the alkoxy groups was observed. The resulting products H1, H2 and H3 have an average of two alkoxy groups bound to one silicon atom. The respective products are described below as SH resins H1, H2 and H3.

SH resin systems:
H1 (has on average two alkoxy groups and two (OH/O . . . ) groups per Si atom)

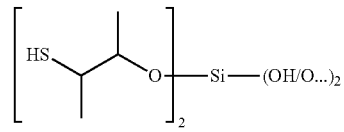

H2 (has on average two alkoxy groups and two (OH/O . . . ) groups per Si atom)

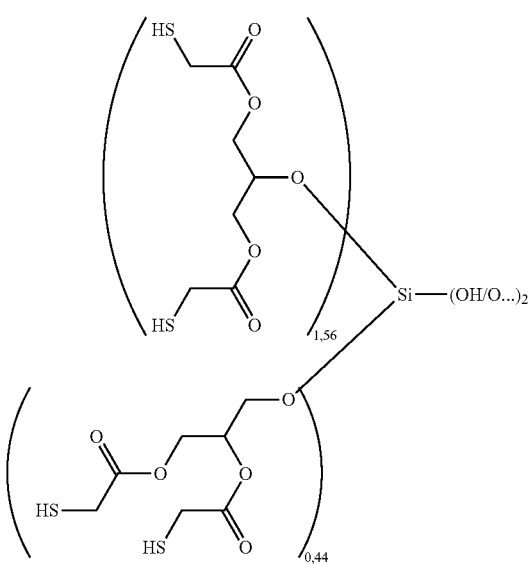

H3 (has on average two alkoxy groups and two (OH/O . . . ) groups per Si atom)

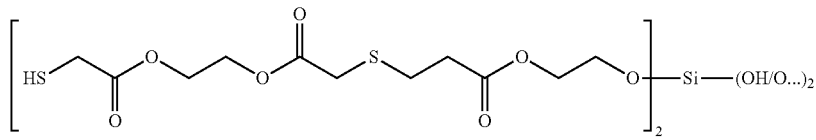

D. Preparation of the crosslinkers (compounds (2)) D1.

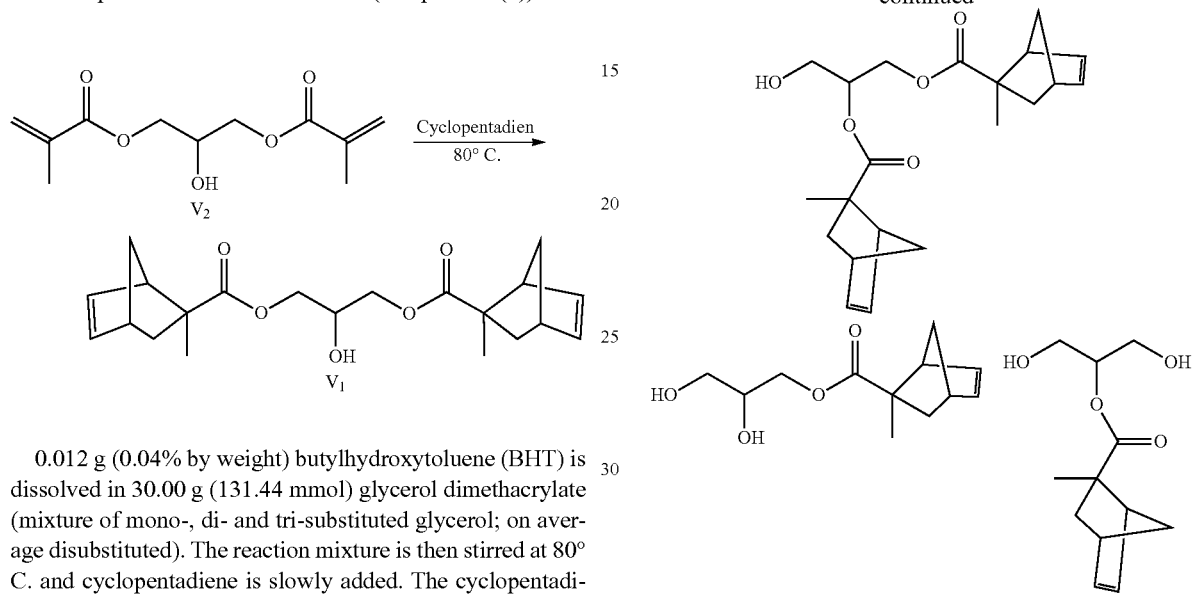

0.012 g (0.04% by weight) butylhydroxytoluene (BHT) is dissolved in 30.00 g (131.44 mmol) glycerol dimethacrylate (mixture of mono-, di- and tri-substituted glycerol; on average disubstituted). The reaction mixture is then stirred at 80° C. and cyclopentadiene is slowly added. The cyclopentadiene is prepared in parallel by thermal cleavage of dicyclopentadiene and transferred to the reaction mixture by distillation. The conversion of the methacrylate group is monitored by $^1$H-NMR spectroscopy. After completion of the reaction, unreacted cyclopentadiene and dicyclopentadiene are removed from the reaction mixture under reduced pressure. Yield: 47.31 g (100%).

If, as in the above example, a mixture of different isomers of glycerol dimethacrylate is used, corresponding mixtures of isomers of V1 are formed, which can be represented as follows:

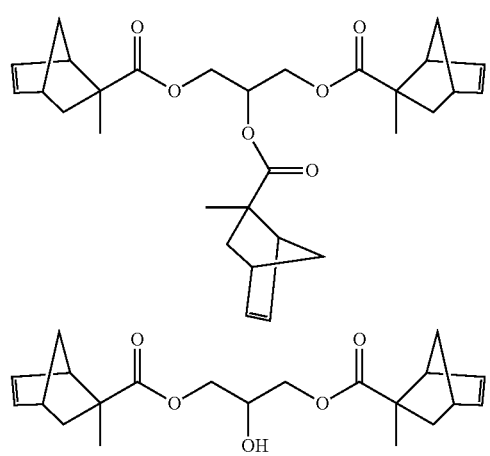

In the exemplary case, the proportions of the isomers of glycerol dimethacrylate (and accordingly of the product isomers) (read from top to bottom) were 18, 49, 16, 16 and 1 mol %. Of course, other isomer ratios or isomer mixtures or pure isomers can also be used.

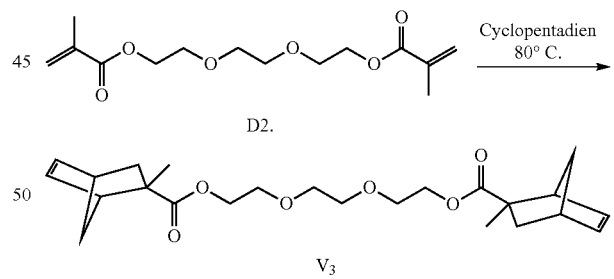

0.012 g (0.04% by weight) butylhydroxytoluene (BHT) is dissolved in 30.00 g (104.78 mmol) triethylene glycol dimethacrylate. The reaction mixture is then stirred at 80° C. and cyclopentadiene is slowly added. The cyclopentadiene is prepared in parallel by thermal cleavage of dicyclopentadiene and transferred to the reaction mixture by distillation. The conversion of the methacrylate group is monitored by $^1$H-NMR spectroscopy. After completion of the reaction, unreacted cyclopentadiene and dicyclopentadiene are removed from the reaction mixture under reduced pressure. Yield: 43.25 g (100%).

D3. Other examples of crosslinkers, some of which can be produced in a similar way to V3, are

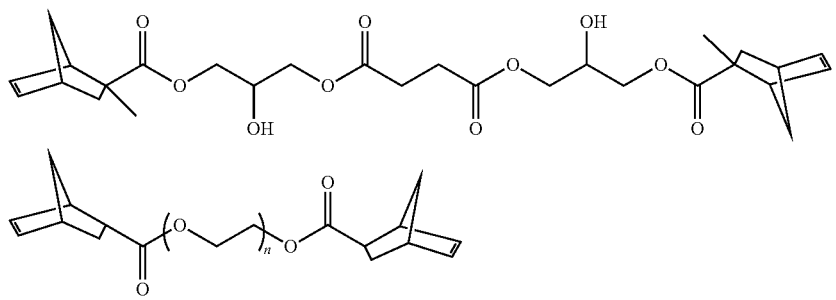

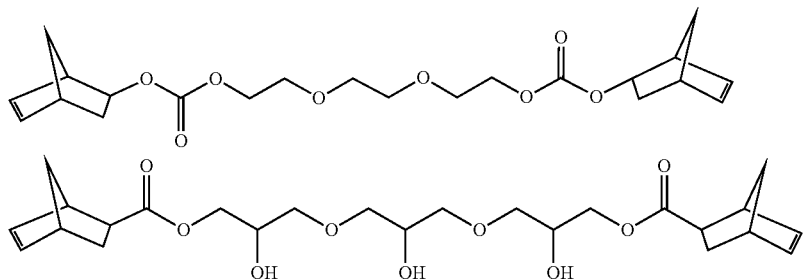

e.g. with Mn=575 g/mol i.e. on average n=10-11, or with Mn=700 g/mol).

Because the norbornenyl groups of the above di-norbornenyl compounds are attached to the polyglycol via carbonacid groups or carbonate groups, a water-soluble hydrocarbonaceous chain is formed during hydrolysis. Such crosslinkers are therefore suitable as component (2). The water solubility of the degradation products can also be achieved by hydroxy groups (see the lowest of the above crosslinkers).

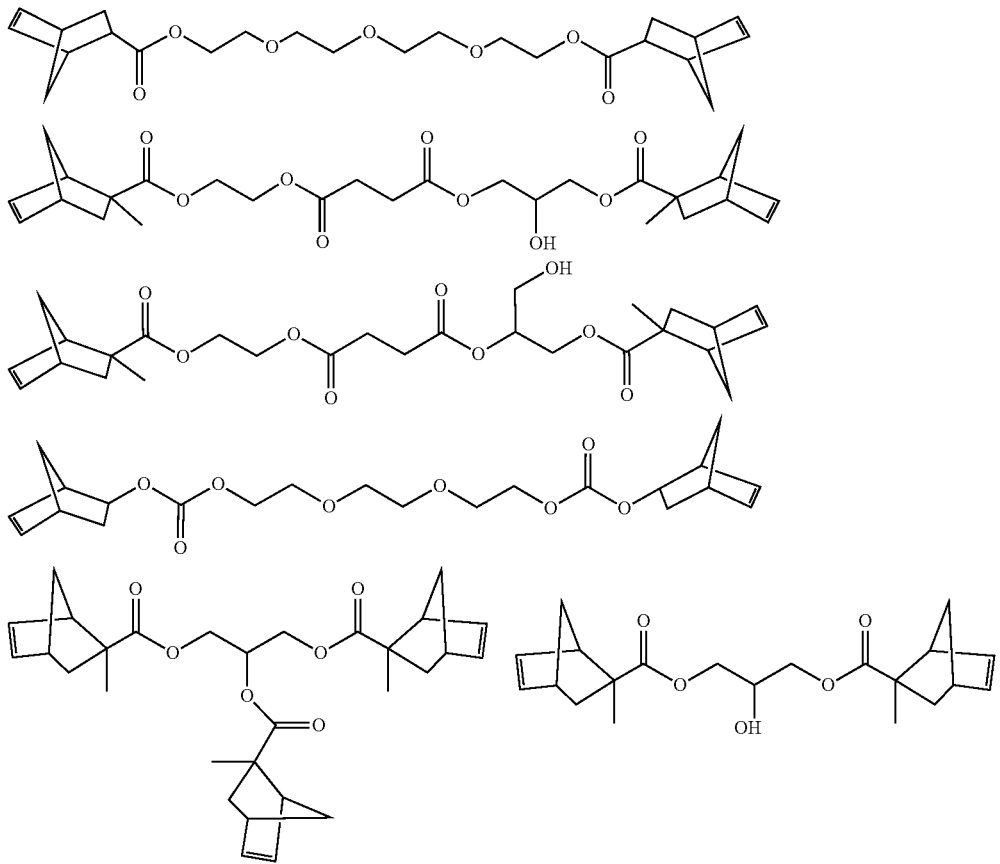

D4. Examples of crosslinkers with C=C double bonds
Allyl ether
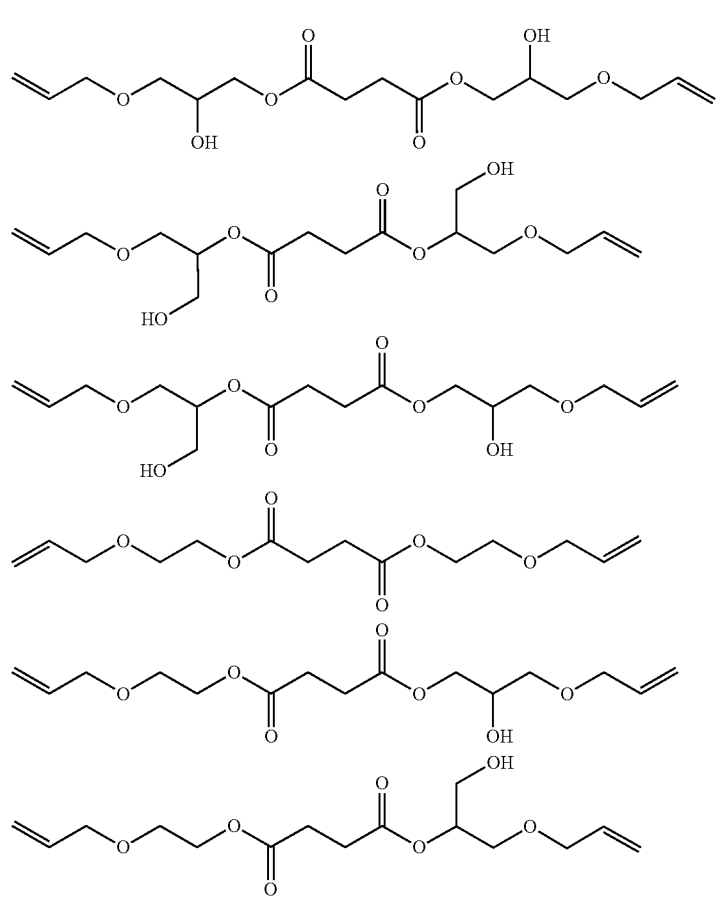
Vinyl ester
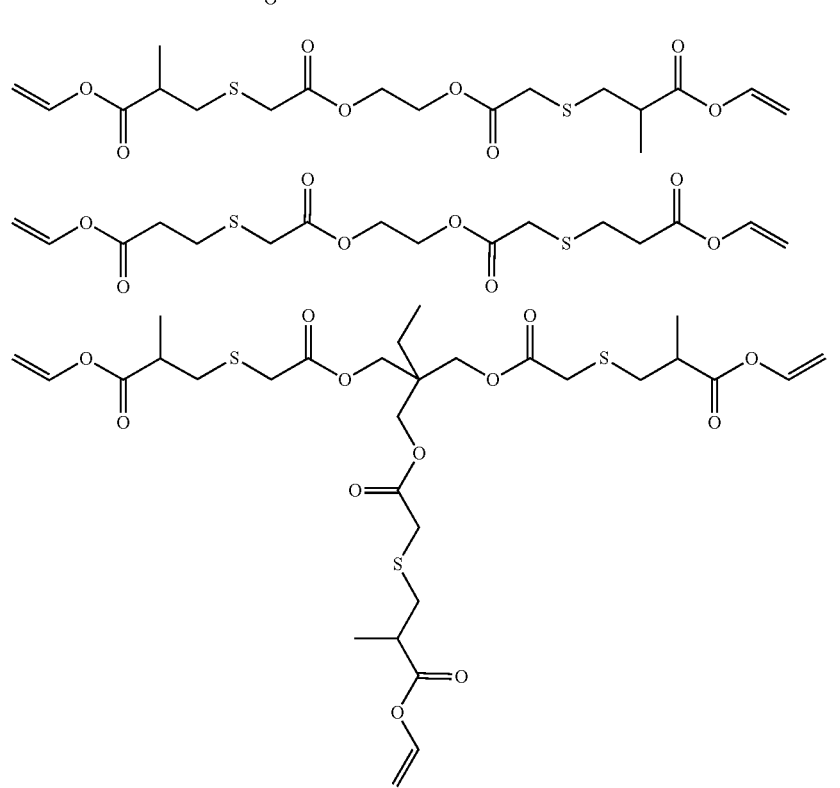

-continued

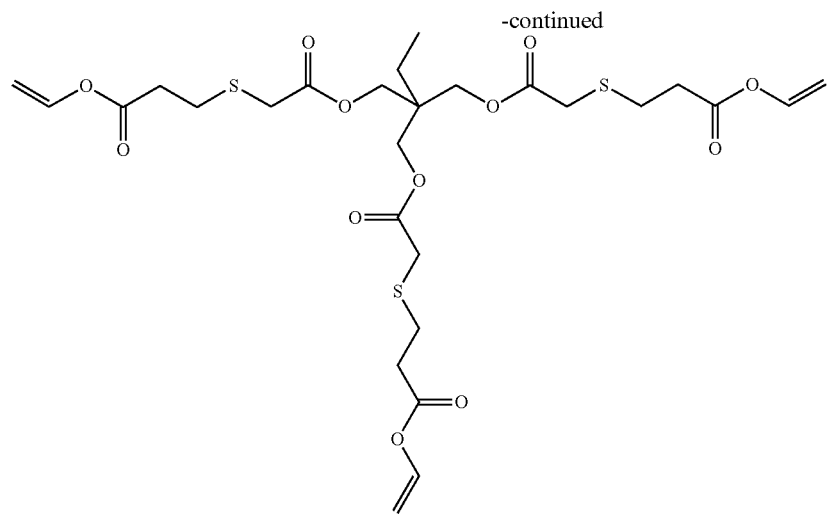

More crosslinkers:

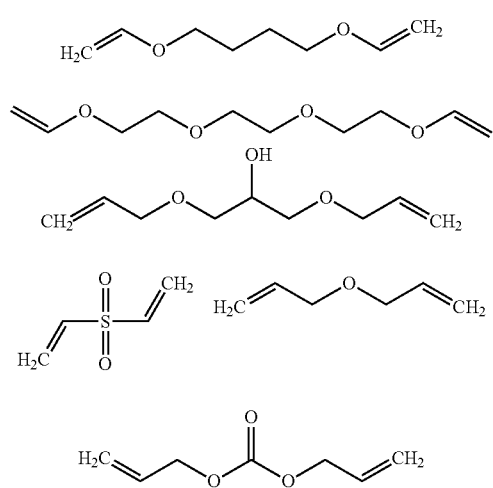

E. Curing of resin systems/test specimen preparation and characterization

| E1. Mechanical tests: | | |
|---|---|---|
| | Tensile-E-Module | Tensile strength |
| H2 + V2 | ~35 MPa | ~1.6 MPa |
| H1 + V1 | ~1900 MPa | ~17 MPa |

It can be seen that with the materials according to the invention, a specifically sought-after adaptation of the mechanical values to certain fabrics can be achieved. Since both the inorganic and the organic cross-linking density can be adjusted, the expert can achieve exactly the desired values by suitable selection within the parameters described in the invention.

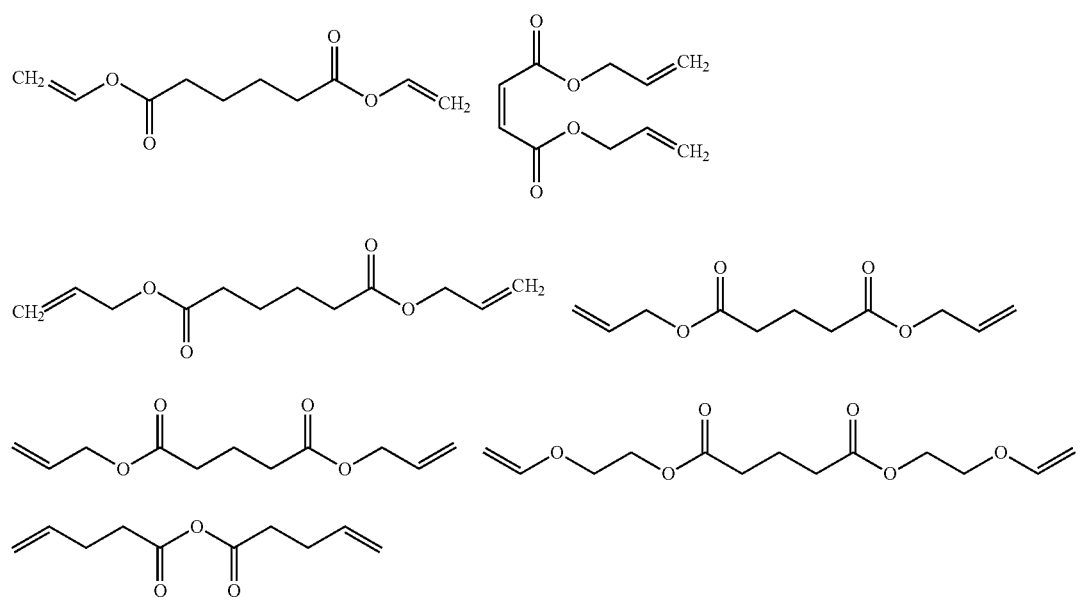

E2. Degradation tests

Sample preparation:

0.04 g of 1.5-diazabicyclo[4.3.0]non-5-ene was dissolved in 4.77 g V2. After the addition of 5.50 g H2, the specimens (diameter 10 mm; height 2 mm) were cured in the furnace at 100° C. for 1 h.

0.10 g Lucerin-TPO and 0.02 g pyrogallol were dissolved in 5.55 g V1. After the addition of 4.00 g H1, the specimens (diameter 10 mm; height 2 mm) were cured by exposure to light (2×5 min).

Mass loss+water absorption:

The specimens were stored in distilled water or in buffer solutions (phosphate buffer and carbonate buffer) at 37° C. The degradation medium was renewed every 5-7 days.

The weight loss of the samples was determined after 16 weeks.

The following weight loss was observed:

| Sample | Degradation medium | Weight loss after 16 weeks |
|---|---|---|
| V2 + H2 | Dest. H2O | 28% |
| V2 + H2 | Phosphate buffer | 20% |
| V2 + H2 | Carbonate Buffer | 100% |
| V1 + H1 | Dest. H2O | 5% |
| V1 + H1 | Phosphate buffer | 3% |
| V1 + H1 | Carbonate Buffer | 6% |

The degradation rate is strongly dependent on the pH value of the degradation medium and the network structure of the material system used and can be adjusted accordingly and adapted to the requirements.

The following water absorption was observed:

| Sample | Degradation medium | Water absorption after 16 weeks |
|---|---|---|
| V2 + H2 | Dest. H2O | 50% by weight on dry weight |
| V2 + H2 | Phosphate buffer | 100% by weight on dry weight |
| V2 + H2 | Carbonate Buffer | 54% by weight based on dry weight (after 4 weeks; completely degraded after 16 weeks) |
| V1 + H1 | Dest. H2O | 10% by weight on dry weight |
| V1 + H1 | Phosphate buffer | 7% by weight based on dry weight |
| V1 + H1 | Carbonate Buffer | 14% by weight based on dry weight |

The water absorption correlates with the above mass loss and the described dependencies.

A comparison of the two examples above shows that the water absorption can be varied by selecting suitable compounds/condensates (1) and (2). For example, the replacement of V2 by V1 (replacement of the methacrylate groups by norbornenyl groups) leads to a stronger hydrophobicity of the product. At the same time, replacing the resin H2 with H1 reduces the distance between the SH groups and the Si atoms and thus increases the crosslinking potential. Both effects should contribute to the observed reduction in water absorption.

→$^1$H-NMR examinations:

V2+H2: The degradation media were examined by $^1$H-NMR spectroscopy to identify possible degradation products. The cleavage of the Si—O—C bond between the organic and inorganic network could be detected. Also the hydrolytic cleavage of all other predetermined breaking points (in the listed design examples ester groups) could be confirmed by the detection of glycerol in the degradation media.

V1+H1: The degradation media were examined by $^1$H-NMR spectroscopy to identify possible degradation products. The cleavage of the Si—O—C bond between the organic and inorganic network was detected.

F. 3D printing using Digital Light Processing (DLP)

The described degradable inorganically pre-crosslinked silanes e.g. H1, H2 and/or H3 can be additionally organically crosslinked and thus cured with the described crosslinkers e.g. V1, V2 and/or V3 by the photoreactive groups. This enables the processing of the described material in a 3D printer, which is also based on the DLP principle. Individual structures can be created.

Application example 1

0.26 g Lucerin-TPO and 0.052 g pyrogallol were dissolved in 16.12 g V3. After the addition of 10.00 g H1, the material could be processed in a 3D printer (DLP process) of Rapidshape S60-LED and the desired shape could be produced. The shaped body produced in this way is shown in FIG. 1.

Figure 2:
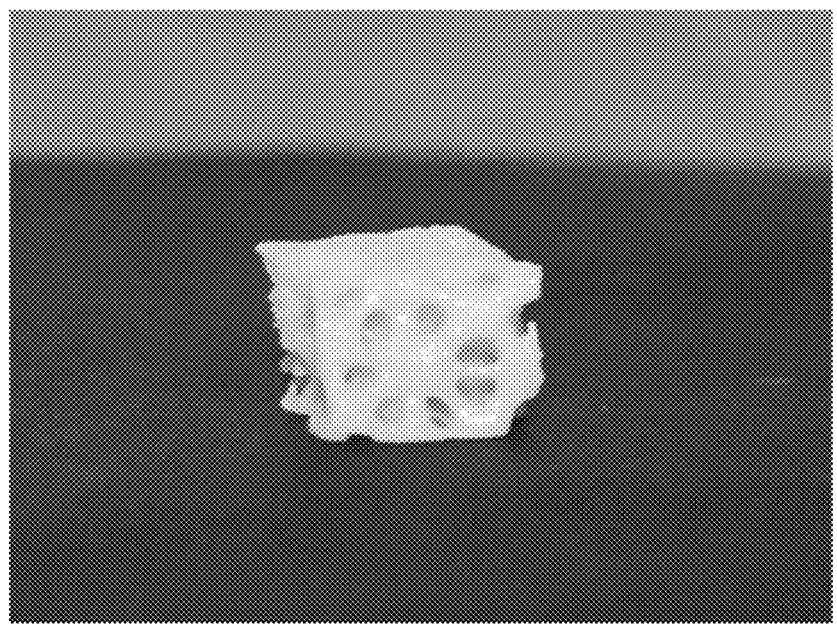
FIG. 2 shows a porous shaped body printed by the same process, also made of a material which is in accordance with the invention.

The example was repeated, with 0.5% by weight titanium oxide nanoparticles added as filler. The porous shaped body produced in this way (shown in FIG. 2) is suitable, for example, as a bone replacement material.

Application example 2-3D-printed component made of degradable hybrid polymer

Material system used:

H1+V3

+1 weight % LUCIRIN® TPO (initiator)

+0.05% by weight pyrogallol

+1 wt % $TiO_2$ nanoparticles

LUCIRIN® TPO and pyrogallol were dissolved in V3, then H1 was added and homogeneously mixed. Afterwards the $TiO_2$ nanoparticles were incorporated with a speed mixer (DAC 150 FVZ, Hauschild Engineering, Hamm) at 2000 rpm for 3 minutes.

Used 3D printer:

Rapidshape S60 LED (DLP principle)

Processing parameters during printing:

Burn-in factor: 300%.

Burn-in gradient: 7 layers

Pressing force: −50.0 mN/mm2

Release force: 40.0 mN/mm2

Separation distance: 500 µm

Energy: 1500.0 mJ/dm2

The material system was processed in the so-called 3D printer to a grid cube with an edge length of 1 cm and interconnected pores.

What is claimed is:

1. A silane of the formula

$$R^1{}_aSiR_{4-a} \quad (1)$$

wherein the group $R^1$ or each of the groups $R^1$ independently
is bound to the silicon via an oxygen atom,
has a straight or branched hydrocarbonaceous chain containing a plurality of chain sections each having not more than 8 consecutive carbon atoms, each of the chain sections of the hydrocarbonaceous chain being separated from the next chain section by a cleavable group being an ester or by a thioether group, and
has at least one thiol group, the group R or each of the groups R is independently a hydrolytically condensable group selected from alkyl-COO—, alkyl-O— and HO—, and a is 1,2,3 or 4.

2. The silane of the formula (1) according to claim 1, in which at least one of the chain sections of the hydrocarbon skeleton of the radical $R^1$ has a maximum of six consecutive carbon atoms.

3. The silane of formula (1) according to claim 1, wherein at least one of the chain sections of the hydrocarbonaceous chain of the radical $R^1$ are:
- (i) composed of alkylene units, the alkylene units being unsubstituted or at least one of the alkylene units being substituted with one or more groups selected from hydroxy, carboxylic acid, phosphate, phosphonic acid, phosphoric acid ester and tertiary amino and amino acid groups; and/or
- (ii) interrupted by one or more oxygen atoms and/or sulphur atoms and/or sulphonyl groups.

4. The silane of the formula (1) according to claim 1, in which at least one of the chain sections of the hydrocarbonaceous chain of the radical $R^1$ (i) has at least one of the substituted alkylene units and (ii) is interrupted by one or more oxygen atoms and/or sulfur atoms and/or sulfonyl groups.

5. An organically modified silica polycondensate comprising a hydrolytic condensation product of a silane according to claim 1 or a mixture of a plurality of said silanes.

\* \* \* \* \*